United States Patent
Naseh et al.

(10) Patent No.: US 7,609,619 B2
(45) Date of Patent: Oct. 27, 2009

(54) ACTIVE-ACTIVE DATA CENTER USING RHI, BGP, AND IGP ANYCAST FOR DISASTER RECOVERY AND LOAD DISTRIBUTION

(75) Inventors: Zeeshan Naseh, Santa Clara, CA (US); Vinay Gundi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 707 days.

(21) Appl. No.: 11/067,037

(22) Filed: Feb. 25, 2005

(65) Prior Publication Data
US 2006/0193252 A1 Aug. 31, 2006

(51) Int. Cl.
*G06F 11/00* (2006.01)
(52) U.S. Cl. .......................................... 370/225
(58) Field of Classification Search ................. 370/216, 370/217, 218, 219, 220, 221, 222, 223, 224, 370/225, 226, 395.52, 396, 397, 400, 401, 370/408; 709/219
See application file for complete search history.

(56) References Cited

U.S. PATENT DOCUMENTS

| | | | | |
|---|---|---|---|---|
| 6,173,324 | B1 * | 1/2001 | D'Souza | 709/224 |
| 6,714,549 | B1 | 3/2004 | Phaltankar | |
| 6,760,775 | B1 * | 7/2004 | Anerousis et al. | 709/238 |
| 6,785,737 | B2 | 8/2004 | Lee et al. | |
| 6,963,575 | B1 * | 11/2005 | Sistanizadeh et al. | 370/404 |
| 7,260,645 | B2 | 8/2007 | Bays | |
| 2002/0124080 | A1 * | 9/2002 | Leighton et al. | 709/224 |
| 2003/0039212 | A1 | 2/2003 | Lloyd et al. | |
| 2003/0067924 | A1 * | 4/2003 | Choe et al. | 370/400 |
| 2003/0118024 | A1 | 6/2003 | Lee et al. | |
| 2004/0008700 | A1 | 1/2004 | Visser et al. | |
| 2004/0042396 | A1 | 3/2004 | Brown et al. | |
| 2004/0085965 | A1 * | 5/2004 | Fotedar | 370/397 |
| 2004/0143662 | A1 | 7/2004 | Poyhonen et al. | |
| 2004/0218584 | A1 | 11/2004 | Brown | |
| 2004/0257983 | A1 * | 12/2004 | Kopp et al. | 370/217 |
| 2005/0010653 | A1 * | 1/2005 | McCanne | 709/219 |
| 2005/0068968 | A1 | 3/2005 | Ovadia et al. | |

(Continued)

OTHER PUBLICATIONS

Data Center Design and Implementation with Cisco Catalyst 6500 Service Modules, Copyright 2004, 88 pages, Version 2.0, Cisco Systems, Inc., San Jose, CA, USA.

(Continued)

*Primary Examiner*—Chirag G Shah
*Assistant Examiner*—Yong Zhou
(74) *Attorney, Agent, or Firm*—Schwegman, Lundberg & Woessner, P.A.

(57) ABSTRACT

A distributed data center topology having at least a pair of active data centers that can recover from a disaster at one of the data centers and achieves load balancing using IGP (Interior Gateway Protocol) between data centers. The distributed data centers use virtual IP addresses, route health injection and Border Gateway Protocol (BGP) for business continuance, disaster recovery and load balancing. The active/active topology supports load balancing where each site concurrently hosts active applications or applications can be hosted in a logical active/standby mode. IGP and RHI (Route Health Injection) are used to propagate routes to an edge router and BGP (Border Gateway Protocol) and IP Anycast are used for site-to-site recovery and load balancing between data center sites.

10 Claims, 4 Drawing Sheets

U.S. PATENT DOCUMENTS

| | | | |
|---|---|---|---|
| 2005/0089015 | A1 | 4/2005 | Tsuge et al. |
| 2006/0036761 | A1 | 2/2006 | Amra et al. |
| 2006/0050719 | A1 | 3/2006 | Barr et al. |
| 2006/0193252 | A1 | 8/2006 | Naseh et al. |
| 2006/0195607 | A1 | 8/2006 | Naseh et al. |

OTHER PUBLICATIONS

Business Ready Data Center, Copyright 1992-2005, 2 pages, Cisco Systems, Inc., San Jose, CA, USA.

On-Line Education, International Engineering Consortium, Copyright 2005, 2 pages, Cisco Systems, Inc., San Jose, CA, USA.

Policy-Based Routing, Copyright 1996, p. 1-7, Cisco Systems, Inc., San Jose, CA, USA.

CSM One-Arm Design in the Data Center, Copyright 2004, 22 pages, Version 2.0, Cisco Systems, Inc., San Jose, CA, USA.

Virtual LAN Security Best Practices, Copyright 1992-2002, pp. 1-13, Cisco Systems, Inc., San Jose, CA, USA.

Removing Content Switching Performance Barriers: A Discussion of the Cisco CSM Pipelined Network Processor Architecture, Copyright 1992-2002, pp. 1-20 Cisco Systems, Inc., San Jose, CA, USA.

Routing Basics, Internetworking Technologies Handbook, Feb. 20, 2002, Copyright 1992-2002, pp. 1-10, Cisco Systems, Inc., San Jose, CA, USA.

Katabi, et al, A Framework for Scalable Global IP-Anycast (GIA), 13 pages, MIT Laboratory for Computer Science, Cambridge, MA, USA / This research was supported by the US Defense Advanced Research Projects Agency (DARPA) under contract No. N66001-98-1-8903.

Semeria, Understanding IP Addressing: Everything You Ever Wanted to Know, Copyright 2001, 76 pages, 3Com Corporation, Santa Clara, CA, USA.

What's A Netmask? And Why Do I Need One?, Apr. 2000, 3 pages, http://www.johnscloset.net/primer/subnet.html.

Brennen, The Name Service How To, Copyright 2004, version 0.04, pp. 1-20.

Removing Content Switching Performance Barriers: A Discussion of the Cisco CSM Pipelined Network Processor Architecture, Copyright 1992-2002, pp. 1-20, Cisco Systems, Inc., San Jose, CA USA.

Release Notes for Catalyst 6500 Series Content Switching Module Software Release 3.1(9), Copyright 2004, Nov. 2004, 68 pages, Software Release 3.1(9), Cisco Systems, Inc., San Jose, CA USA.

Morrissey, P., "Multihoming with BGP4", *Network Computing*, 10, (Dec. 1999), pp. 117-118, 120, 122.

US 7,525,906, 04/2009, Naseh et al. (withdrawn).

"U.S. Appl. No. 11/065,871, Non-Final Office Action mailed May 15, 2008", 19 pgs.

"U.S. Appl. No. 11/065,871, Response filed Oct. 22, 2008 to Non-Final Office Action mailed May 15, 2008", 11 pgs.

"U.S. Appl. No. 11/066,955, Final Office Action mailed Jan. 26, 2009", 20 pgs.

"U.S. Appl. No. 11/066,955, Non-Final Office Action mailed Aug. 7, 2008", 17 pgs.

"U.S. Appl. No. 11/066,955, Response filed Apr. 27, 2009 to Final Office Action mailed Jan. 26, 2009", 9 pgs.

"U.S. Appl. No. 11/066,955, Response filed Dec. 3, 2008 to Non-Final Office Action mailed Aug. 7, 2008", 7 pgs.

"U.S. Appl. No. 12/420,241, Preliminary Amendment mailed Apr. 9, 2009", 7 pgs.

\* cited by examiner

US 7,609,619 B2

ACTIVE-ACTIVE DATA CENTER USING RHI, BGP, AND IGP ANYCAST FOR DISASTER RECOVERY AND LOAD DISTRIBUTION

RELATED APPLICATIONS

This application is related to the following co-pending and commonly assigned U.S. patent applications: Ser. No. 11/065,871, filed on Feb. 25, 2005, entitled "Disaster Recovery For Active-Standby Data Center Using Route Health And BGP"; and Ser. No. 11/066,955, filed on Feb. 25, 2005, entitled "Application Based Active-Active Data Center Network Using Route Health Injection and BGP"; the disclosures of which are incorporated herein by reference for all purposes.

COPYRIGHT NOTICE

A portion of the disclosure recited in the specification contains material that is subject to copyright protection. Specifically, documents provided with this application include source code instructions for a process by which the present invention is practiced in a computer system. The copyright owner has no objection to the facsimile reproduction of the specification as filed in the Patent and Trademark Office. Otherwise, all copyright rights are reserved.

BACKGROUND OF THE INVENTION

The present invention relates to a data center topology that can recover from a disaster and more particularly to a distributed data center that uses route health injection (RHI) and Border Gateway Protocol (BGP) for business continuance, disaster recovery and load balancing.

Data centers store business information and provide global access to the information and application software through a plurality of computer resources. Data centers may also include automated systems to monitor server activity, network traffic and performance. Data centers may be known by a variety of names such as, by way of example, a server farm, hosting facility, data farm, data warehouse, co-location facility, co-located server hosting facility, corporate data center, managed data centers, internet hotel, internet service provider, application service provider, full service provider, wireless application service provider or other data network facility. Regardless of the name used, a typical data center houses computer resources such as mainframe computers; web, application, file and printer servers executing various operating systems and application software, storage subsystems and network infrastructure. A data center may be either a centralized data center or a distributed data center interconnected by either a public or private network.

A centralized data center provides a single data center where the computer resources are located. Because there is only one location, there is a saving in terms of the number of computer resources required to provide services to the user. Because there is only one location, management of the computer resources is much easier and capital and operating costs are reduced. Unfortunately, centralized data centers are rarely capable of providing the necessary reliability required under common service level agreements for a geographically diverse organization and the service is susceptible to interruption in the event of a disaster, such as a fire or earthquake, equipment malfunction or denial of service attack. For these reasons, a centralized data center is rarely relied upon as the sole data center for critical applications.

A distributed data center is one that locates computer resources at geographically diverse data centers. The use of multiple data centers provides critical redundancy, albeit at higher capital and operating costs, business continuity, disaster recovery, and load-sharing solutions. One type of distributed data center topology comprises at least a pair of data centers, both of which are active and traffic goes to the nearest active data center. Further, each data center may host applications so there must be a mechanism in place to balance the traffic load on each data center. It is also necessary in the event of a disaster where one data center is inoperable, that traffic directed to an application at the inoperable data center is seamlessly directed to another active data center.

Some distributed data centers use Domain Name System (DNS) for managing business continuance and load sharing between multiple data centers. DNS resolves hostnames to IP addresses and these addresses are cached for use by the end users and other DNS servers. Unfortunately, when DNS is utilized to direct traffic to the appropriate data center, performance is severely affected when one data center experiences a loss of a server or other disaster because the time it takes to clear the DNS cache throughout the network can take over 20 minutes. During this time, traffic cannot be re-routed to the other data center. In other instances, http-redirection is used to perform these tasks but even worse delays are experienced when there is a disaster at one of the data centers. Clearly, this extensive delay is unacceptable.

What is needed is a distributed data center topology that can quickly recover from a disaster at one of the data centers by re-routing traffic to the other data center. What is also needed is a data center topology that can load balance traffic during normal operation.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
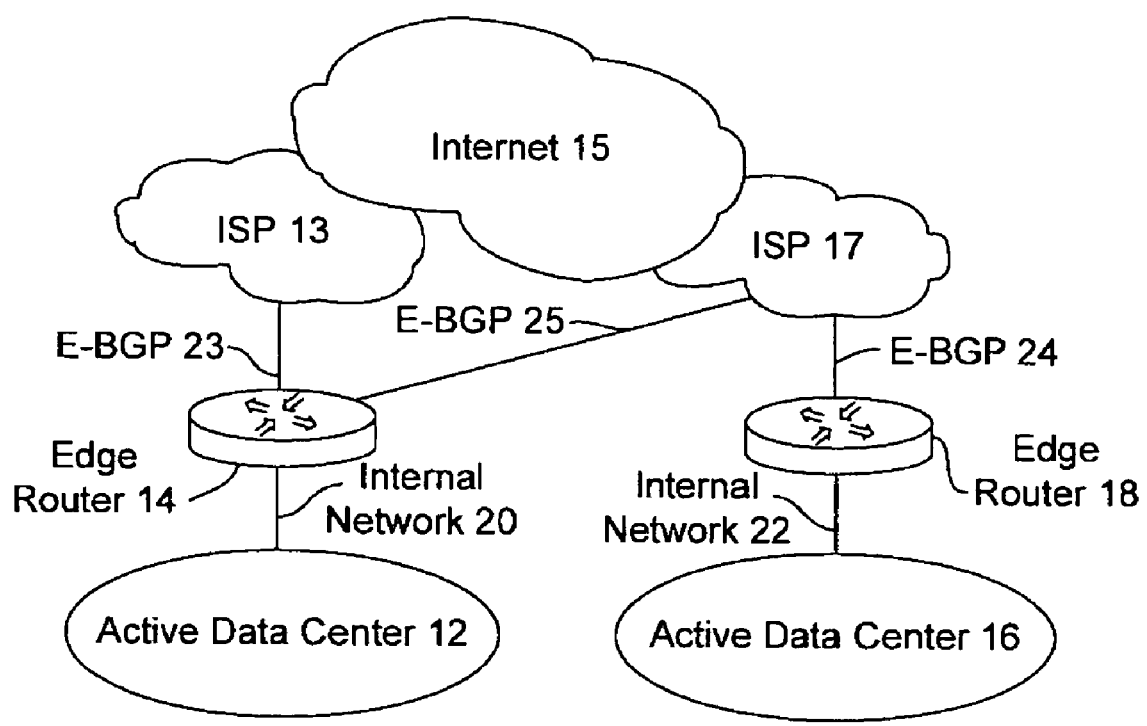
FIG. 1 is a block diagram of an exemplary active/active data center without an I-BGP link between data centers in accordance with an embodiment of the present invention.

Referring now to the drawings more particularly by reference numbers, a simplified block diagram of a representative topology for a distributed active-active data center is shown in FIG. 1. In this topology, a first data center 12 interfaces to a first internet service provider (ISP) 13 through edge router 14. ISP 13 is part of the world wide web and can couple to other ISPs through the internet which is represented by internet cloud 15. A second data center 16 is coupled to a second ISP 17 and to the internet 15 by edge router 18. One or both of data centers 12 and 16 may be coupled to a second ISP to ensure a redundant link to the internet. Together data centers 12 and 16 comprise an autonomous system. The autonomous system may comprise as few as two separate data centers and as many as sixteen. An autonomous system is a group of networks under a common administration and with common routing policies. Each AS has a unique identification number (the "AS number") assigned to it to provide for identification worldwide.

Communication between router 14 and data center 12; and between router 18 and data center 16 occurs over internal networks 20 and 22, respectively, using IGP or, more specifically, the Interior Gateway Protocol. IGP is a well-known protocol that exchanges routing information within an autonomous system.

Interautonomous system routing uses BGP or, more specifically the Exterior Border Gateway Protocol (E-BGP), to exchange routing information for ISPs 3 and 17 and the internet as indicated by E-BGP 23, 24 and 25 links. E-BGP is a routing protocol used to exchange routing information across the internet. This protocol makes it possible for ISPs to connect to each other and for data centers 12 and 16 to connect to more than one ISP and to exchange network routing information with other networks.

E-BGP utilizes a best path algorithm that follows a series of steps to determine the best path to a router at a specific destination. For routers and switches that implement BGP, one preferred router, by way of example is the Catalyst 6509 router, which is commercially available from Cisco Systems, the assignee of the present invention.

For site-to-site load balancing purposes, both data centers host active applications and serve clients. Applications are software programs that use the operating system to control the data center's computer resources. In an active/active scenario applications are functional in both the data centers.

Both data centers 12 and 16 advertise the same route but from two different sites. The internal IGP is configured in a manner that is dependant on how the applications are hosted and will vary from data center to data center. In one embodiment shown in FIG. 2, the internal network topology of each data centers includes a Content Switching Module (CSM) 26 installed on router 27. In one preferred embodiment, router 27 is a CAT 6500 available from Cisco Systems, the parent company of the assignees of the present invention. Both data centers 12 and 16 use the same virtual IP address (VIP) to represent the server cluster for each application, and the same sub-net that comprises all the VIPs is advertised with BGP. Each real server in a server farm 28 will have a unique IP address and with the VIP address space supports multiple active data centers. The routing infrastructure then directs any client request to the topologically nearest site using the IP Anycast mechanism. It is important that the routing infrastructure be stable because route flapping could cause long-lived application sessions (such as TCP) to break.

In one preferred embodiment, the IP Anycast mechanism allows clients to request the topologically closest data center. This mechanism offers several advantages in routing a request to data centers 12 and 16 including the termination of client requests at the closest data center thereby minimizing transit times. Typically, the number of hops required for a client to access the site determines the nearest site. Another advantage is that clients achieve "stickiness" and do not bounce between sites because of DNS or Microsoft Internet Explorer algorithms that would arbitrarily route clients to various data centers during a session. Yet another advantage is that clients are dynamically distributed between available sites thereby achieving a degree of load balancing.

RHI is used to inject routes of interest to routers 27. Each router 27 is preferably a CATALYST 6500 router in which case CSM 29 and router 27 share a common chassis. Routers 27 are coupled to edge routers 14 and 18 by the IGP internal network, which is represented by VLAN 29 in FIG. 2. Edge routers 14 and 18 are coupled to routers 35 and 36 at two different ISPs with edge router 14 coupled to a second ISP for redundancy.

RHI is activated at each active data center using the "advertise active" command available with virtual servers. This command tells CSM 29 to install a host route in the router only if the virtual server is in an operational state. A virtual server is in the operational state when at least one of the servers in the same server farm is operational. If a server is down, the CSM is responsible for informing the router to remove the route off. Extensive probing is available on the CSM to check the health of the servers and the appropriate application daemon that runs on the servers. For RHI to work, both the router and the CSM must share a client-side VLAN 26. In the preferred embodiment, the router and the CSM co-exist in the same chassis to minimize compatibility issues when CSM installs a host route into the router using a protocol-independent message. However, in other embodiments, it is possible to install a host route from a load balancer that does not share the same chassis. In such instance, the load balancer may use a secondary channel to install a new host route or remove a route when servers are no longer available. Alternatively, if the load balancer supports the routing protocol, it may utilize an IP connection to remove a route or to install a new route.

Figure 2:
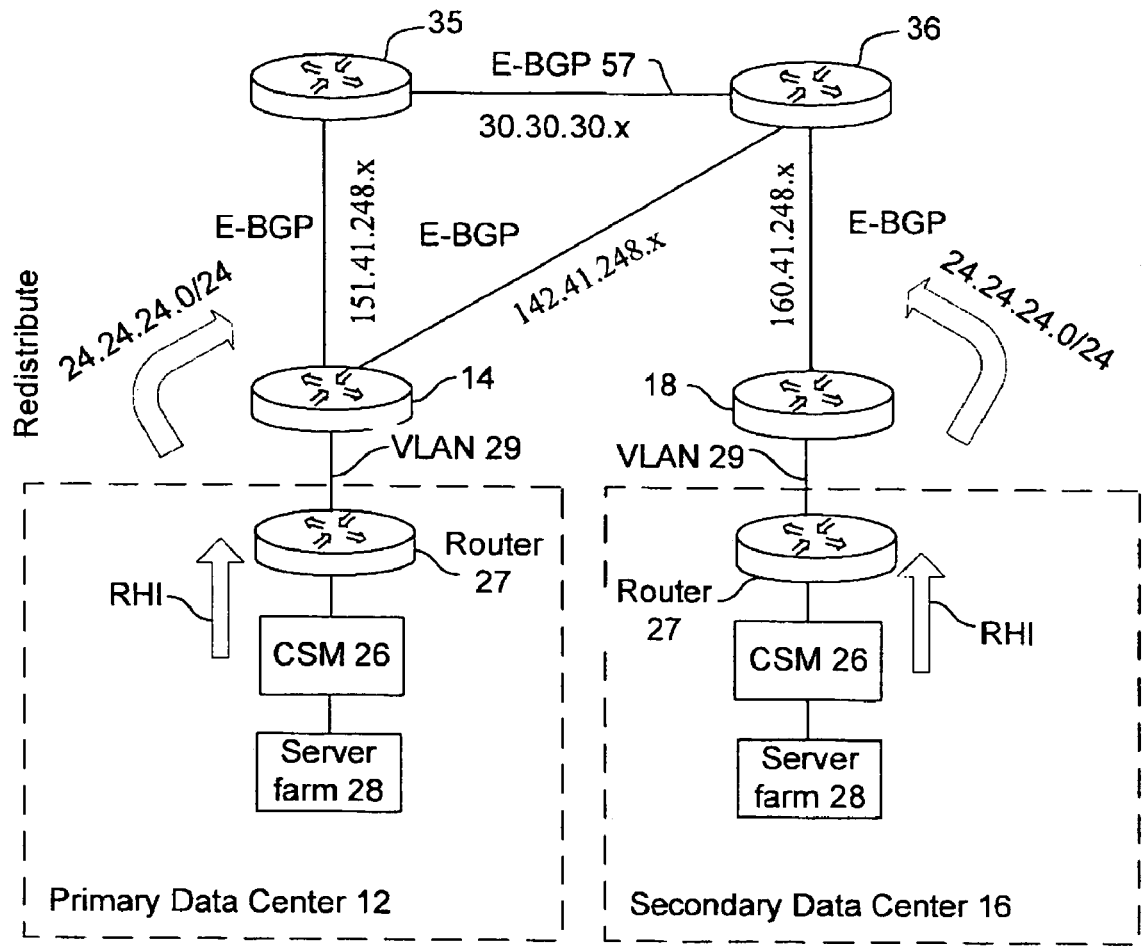
FIG. 2 is a block diagram of another exemplary active/active data center without an I-BGP link between data centers in accordance with an embodiment of the present invention.

Implementation of the active/active data center topology of FIGS. 1 and 2 utilizes OSPF route redistribution and summarization as well as BGP route redistribution and route preference. Further, the active/active data center topology provides disaster recovery and content distribution by utilizing a combination of IP Anycast, BGP, IGP and route health injection (RHI).

OSPF Route Redistribution and Summarization

When redistributing RHI static routes into the IGP-specific protocol, OSPF, the metric-type 1 is used for adding the internal cost to the external cost. RHI allows CSM 29 to advertise the availability of a virtual IP (VIP) address throughout the network and to the edge routers 14 or 18. Redistribution is useful when a static route is injected into the routing protocol. Redistribution consists of importing routing information from one routing protocol into another protocol. Multiple CSM devices in multiple server farms with identical VIP addresses and services can exist throughout the network. One data center can advertise a better route metric to the CSM and traffic will be internally routed to that data center. The CSM advertises the VIP address as a host route so that traffic is routed to the data center having the higher capacity. More specifically, each data center advertises the same route and the data center advertising the best metric will receive the traffic.

Since router 27 is preferably a Catalyst 6500 that includes both a multilayer switch card, such as the Cisco MultiLayer Switch Feature Card (MSFC), and a CSM, the host routes are summarized on MSFC in the same chassis as the CSM. Summarization is a process used for reducing the number of routing entries that are maintained for the data centers. In OSPF, summarization typically occurs at the boundary between two autonomous systems. OSPF refers to the Link State architecture, Open Shortest Path First Protocol. To illustrate, when configuring the primary data center 12, the two ISP neighbors are in two autonomous systems and the IP addresses are 151.41.248.129 and 142.41.248.130 respectively. Data centers 12 and 16 are in a third autonomous system. OSPF reconfiguration and summarization is illustrated by the configuration of Table 1:

TABLE 1

```
cat6K_1#sh run | beg router ospf
router ospf 1
    log-adjacency-changes
    summary-address 24.24.24.0 255.255.255.0
    redistribute static metric-type 1 subnets
    network 10.0.0.0 0.0.0.255 area 0
    network 10.4.0.16 0.0.0.3 area 0
    network 10.4.1.0 0.0.0.255 area 0
    network 10.6.0.16 0.0.0.3 area 0
    network 130.40.248.0 0.0.0.255 area 0
!
cat6K_1#sh ip route ospf
    140.40.0.0/26 is subnetted, 1 subnets
O IA 140.40.248.128 [110/4] via 10.0.0.129, 01:32:02, Vlan10
    141.41.0.0/26 is subnetted, 1 subnets
O IA 141.41.248.128 [110/21] via 10.0.0.129, 01:32:07, Vlan10
    24.0.0.0/8 is variably subnetted, 4 subnets, 2 masks
O   24.24.24.0/24 is a summary, 00:02:21, Null0
    130.34.0.0/26 is subnetted, 1 subnets
```

The edge routers receive the default route from the ISP and propagate it down to the data center routers 27. The OSPF configuration on the edge router 14 and 16 looks like the configuration shown in Table 2:

TABLE 2

```
72k-edgePriDC#sh run | beg router ospf
router ospf 1
    log-adjacency-changes
    network 10.0.0.0 0.0.0.255 area 0
    default-information originate
!
```

BGP Route Redistribution and Route Preference

The edge routers 14 and 18 distribute OSPF into their BGP process using a prefix-list and each updates their neighbor with routes 151.41.248.129 and 142.41.248.130 as well as 24.24.24.0/24. The distribution is slightly complicated for edge router 15 because it has links to both ISP1 and ISP2 to which the other edge router, router 16, is also connected. From edge router 14, the preferred embodiment uses MED to configure a lower metric for the route updates sent to router 35 at ISP 13 than for the metric for the route updates sent to router 36 at ISP 17. The MED attribute is used in the BGP tie breaking process when selecting a preferred path to a given address space. As a result, ISP 17 will always prefer data center 16 for reaching 24.24.24.0/24. Further, it is necessary that the weight for the inbound routes (0.0.0.0/0.0.0.0 route) be set so that ISP 13 (referred to as ISP1 in the configuration illustrated in the Tables) has a higher weight (2000) than ISP 17 (referred to as ISP2 in the configuration illustrated in the Tables). As a result, edge router 14 will use router 35 at ISP 13 for its default (next-hop) router. The BGP configuration of data center 12 as the primary site edge router 14 is shown in Table 3:

TABLE 3

```
72k-edgePriDC#sh run | beg router bgp
router bgp 3
    no synchronization
    bgp log-neighbor-changes
    network 142.41.248.128 mask 255.255.255.192
    network 151.41.248.128 mask 255.255.255.192
    redistribute ospf 1 route-map OspfRouteFilter
    neighbor 142.41.248.132 remote-as 2
    neighbor 142.41.248.132 route-map WEIGHT-IN in
    neighbor 142.41.248.132 route-map ISP2-OUT out
    neighbor 151.41.248.131 remote-as 1
    neighbor 151.41.248.131 route-map WEIGHT-IN in
    neighbor 151.41.248.131 route-map ISP1-OUT out
    no auto-summary
!
ip as-path access-list 2 permit ^2$
!
ip prefix-list OspfRoute seq 10 permit 130.34.0.0/16 le 32
ip prefix-list OspfRoute seq 15 permit 20.20.20.0/24
ip prefix-list OspfRoute seq 20 permit 24.0.0.0/8 le 32
access-list 10 permit 20.20.0.0 0.0.255.255
access-list 10 permit 130.34.0.0 0.0.255.255
access-list 10 permit 142.41.0.0 0.0.255.255
access-list 10 permit 151.41.0.0 0.0.255.255
access-list 10 permit 24.24.24.0 0.0.0.255
!
route-map ISP1-OUT permit 10
    match ip address 10
    set metric 20
!
route-map ISP2-OUT permit 10
    match ip address 10
    set metric 30
!
route-map WEIGHT-IN permit 10
    match as-path 2
    set weight 200
!
route-map WEIGHT-IN permit 20
    set weight 2000
!
route-map OspfRouteFilter permit 10
    match ip address prefix-list OspfRoute
!
```

The BGP configuration of data center 16 as the secondary site edge router 18 is shown in Table 4:

TABLE 4

```
72k-edgeSecDC#sh run | beg router bgp
router bgp 3
    no synchronization
    bgp log-neighbor-changes
    network 160.41.248.128 mask 255.255.255.192
    redistribute ospf 1 route-map OspfRouteFilter
    neighbor 160.41.248.132 remote-as 2
    neighbor 160.41.248.132 route-map ISP2-OUT out
    no auto-summary
!
ip prefix-list OspfRoute seq 10 permit 140.40.0.0/16 le 32
ip prefix-list OspfRoute seq 15 permit 20.20.20.0/24
ip prefix-list OspfRoute seq 20 permit 24.0.0.0/8 le 32
!
access-list 10 permit 20.20.0.0 0.0.255.255
access-list 10 permit 24.24.24.0 0.0.0.255
!
!
route-map ISP2-OUT permit 10
    match ip address 10
    set metric 20
!
```

TABLE 4-continued

```
!
   route-map OspfRouteFilter permit 10
      match ip address prefix-list OspfRoute
!
!
```

Once the "OSPF Route Redistribution and Summarization" and "BGP Route Redistribution and Route Preference" configurations are completed, it is possible to implement a novel load balancing solution without an IGP link between data centers 14 and 18. Load balancing solution without IGP is discussed in conjunction with FIG. 2. In this design, the benefits of IP Anycast are obtained without any physical changes to the network environment. More specifically, CSM 29 is used in both data centers 12 and 16 for server load balancing. RHI is enabled so that CSM 29 injects a host static route into the MSFC on the same chassis. These routes are then redistributed and summarized in OSPF. OSPF is redistributed into BGP on the edge routers 14 and 18. The link between edge router 14 and router 36 (ISP 17) is only used for redundancy. Control of incoming and outgoing routes in BGP is accomplished using weights while the MED attribute is used to prefer routes during steady state such as is illustrated in Table 5.

TABLE 5

```
Cat6k-ISP1#sh ip bgp 24.24.24.0
BGP routing table entry for 24.24.24.0/24, version 40
Paths: (2 available, best #1)
   Advertised to non peer-group peers:
   30.30.30.132
   3
      151.41.248.129 from 151.41.248.129 (151.41.248.129)
         Origin incomplete, metric 20, localpref 100, valid, external, best
   2 3
      30.30.30.132 from 30.30.30.132 (160.41.248.132)
         Origin incomplete, localpref 100, valid, external
Cat6k-ISP1#
72k-ISP2#sh ip bgp 24.24.24.0
BGP routing table entry for 24.24.24.0/24, version 27
Paths: (3 available, best #3, table Default-IP-Routing-Table)
   Advertised to non peer-group peers:
   30.30.30.131 142.41.248.129
   1 3
      30.30.30.131 from 30.30.30.131 (151.41.248.131)
         Origin incomplete, localpref 100, valid, external
   3
      142.41.248.129 from 142.41.248.129 (151.41.248.129)
         Origin incomplete, metric 30, localpref 100, valid, external
   3
      160.41.248.130 from 160.41.248.130 (160.41.248.130)
         Origin incomplete, metric 20, localpref 100, valid, external, best
72k-ISP2#
72k-ISP2#
```

Table 6 illustrates the results of a test traceroute from the host connected to ISP 13 during steady state.

TABLE 6

```
3500AP#traceroute 24.24.24.1
Type escape sequence to abort.
Tracing the route to 24.24.24.1
   1 55.55.1.1 0 msec 0 msec 2 msec        (ISP1)
   2 151.41.248.129 0 msec 0 msec 3 msec   (Primary Edge Router)
   3 10.0.0.6 2 msec 0 msec 3 msec         (Primary DC Cat6500)
   4 * * *
```

When servers at data center 12 go down, the 24.24.24.0/24 routes that point to 151.41.248.x on ISP 13 and those that point to 142.41.248.x on ISP13 are removed because edge router 14 stops receiving routes from the connected router 27 in data center 12. These route changes are triggered by the data center's CSM 29 removing the routes from router 27 once it is determined that the servers were down and are illustrated in Table 7. When tested in laboratory settings with minimal routes in the ISP routers, the BGP routes were removed in less then five seconds. However, convergence would be higher in a production network.

TABLE 7

```
Cat6k-ISP1#sh ip bgp 24.24.24.0
BGP routing table entry for 24.24.24.0/24, version 42
Paths: (1 available, best #1)
Flag: 0x820
   Advertised to non peer-group peers:
   151.41.248.129
   2 3
      30.30.30.132 from 30.30.30.132 (160.41.248.132)
         Origin incomplete, localpref 100, valid, external, best
Cat6k-ISP1#
72k-ISP2#sh ip bgp 24.24.24.0
BGP routing table entry for 24.24.24.0/24, version 27
Paths: (1 available, best #1, table Default-IP-Routing-Table)
   Advertised to non peer-group peers:
   30.30.30.131 142.41.248.129
   3
      160.41.248.130 from 160.41.248.130 (160.41.248.130)
         Origin incomplete, metric 20, localpref 100, valid, external, best
72k-ISP2#
```

Table 8 illustrates the results of a test traceroute from the host connected to ISP 13 when servers farm 28 in data center 12 go down.

TABLE 8

```
3500AP#traceroute 24.24.24.1
Type escape sequence to abort.
Tracing the route to 24.24.24.1
   1 55.55.1.1 0 msec 0 msec 3 msec        (ISP1)
   2 30.30.30.132 0 msec 2 msec 3 msec     (ISP2)
   3 160.41.248.130 3 msec 5 msec 3 msec   (Secondary Edge Router)
   4 10.10.0.6 3 msec 2 msec 3 msec        (Secondary DC Cat6500)
   5 * * *
```

For each of the embodiments described above, RHI is used to inject routes of interest and by the standby data center to determine the health of the active or primary data center.

RHI is activated at the active data center using the "advertise active" command available with virtual servers. This command tells CSM 29 to install a host route in the edge router only if the virtual server is in an operational state. A virtual server is in the operational state when at least one of the servers in the same server farm is operational. Extensive probing is available on the CSM to check the health of the server and the appropriate application daemon that runs on the server. For RHI to work, both the edge router and the CSM must share a client-side VLAN 26 such as shown in the configuration example of Table 9.

TABLE 9

```
module ContentSwitchingModule 4
   vlan 14 server
      ip address 130.34.248.161 255.255.255.192
   !
   vlan 26 client
      ip address 10.16.0.2 255.255.255.0
      gateway 10.16.0.1
      alias 10.16.0.3 255.255.255.0
```

TABLE 9-continued

```
!
probe ICMP icmp
    interval 5
    retries 2
!
    serverfarm RHI-TEST
        nat server
        no nat client
        real 130.34.248.129
            inservice
            probe ICMP
!
    vserver RHI-TEST-1
        virtual 24.24.24.1 tcp www
        vlan 26
        serverfarm RHI-TEST
        advertise active
        persistent rebalance
        inservice
!
    vserver RHI-TEST-2
        virtual 24.24.24.2 tcp www
        vlan 26
        serverfarm RHI-TEST
        advertise active
        persistent rebalance
        inservice
!
    vserver RHI-TEST-3
        virtual 24.24.24.3 tcp www
        vlan 26
        serverfarm RHI-TEST
        advertise active
        persistent rebalance
        inservice
!
    ft group 1 vlan 5
        priority 110
!
cat6K_1#
```

The following is the configuration on the interface on the MSFC that connects to the CSM.

TABLE 10

```
cat6K_1#sh run int vlan 26
Building configuration . . .
Current configuration : 60 bytes
!
interface Vlan26
    ip address 10.16.0.1 255.255.255.0
end
cat6K_1#
cat6K_1#sh mod c 4 vlan id 26 detail
vlan IP address IP mask type
--------------------------------------------------
26 10.16.0.2 255.255.255.0 SERVER
    ALIASES
    IP address IP mask
    --------------------------------
    10.16.0.3 255.255.255.0
cat6K_1#
```

The following shows the static route in the MSFC routing table pointing to the alias on the CSM. An alias is a shared IP address, similar to a Hot Standby Router Protocol (HSRP) group IP address.

TABLE 11

```
cat6K_1#cat6K_1#sh ip route static
    24.0.0.0/32 is subnetted, 3 subnets
S     24.24.24.1 [1/0] via 10.16.0.3, Vlan26
S     24.24.24.2 [1/0] via 10.16.0.3, Vlan26
```

TABLE 11-continued

```
S     24.24.24.3 [1/0] via 10.16.0.3, Vlan26
cat6K_1#
```

When implementing the present invention, it is important that all applications that have virtual IP addresses within the announced subnet 24.24.24.0, by way of example. Further, each data center must have front-end and back-end servers in production at both sites and neither site should be taken out of service for maintenance unless routes are pulled from the BGP routing table before the site is taken out of service. Removing routes from the routing table can be accomplished by changing the router bgp configurations on edge routers 14 and 18, changing the router ospf configurations on edge routers 14 and 18 or on the data center routers 27 or taking all the relevant virtual servers out of service so that there is no inservice on the CSMs 29 with the understanding that long-lived TCP applications may break due to instability in the routing infrastructure. Further still, if there is a firewall service module (FWSM) in the data center between CSM 29 and routers 27, RHI will not function properly.

In one embodiment of the present invention, a distributed data center topology comprises at least a pair of active data centers and that can recover from a disaster at one of the data centers and achieves load balancing without a direct I-BGP link between data centers. In this embodiment, IGP (Interior Gateway Protocol) and RHI (Route Health Injection) are used to propagate routes to an edge router and BGP (Border Gateway Protocol) for achieving site-to-site recovery and load balancing between data center sites. Advantageously, there is no requirement that there be a direct link between sites.

Figure 3:
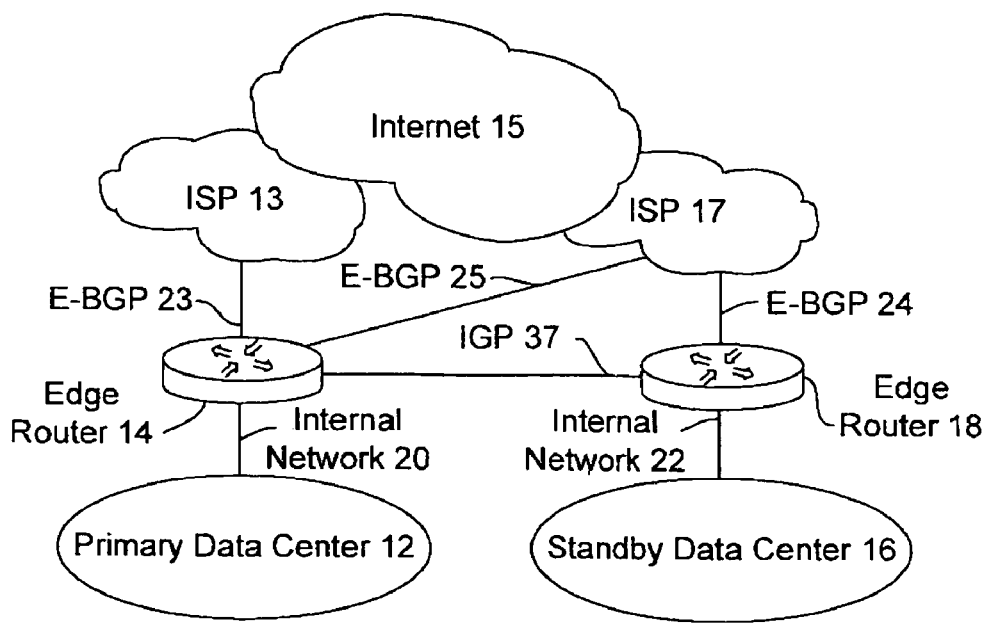
FIG. 3 is a block diagram of another exemplary active/active data center with a link between data centers in accordance with an embodiment of the present invention.

Referring now to FIG. 3, a simplified block diagram of another representative active/active data center is shown. Data center 12 interfaces to two internet service providers (ISP) 13 and 17 through edge router 14. In one preferred embodiment, one data center, such as data center 12, is linked to at least two ISPs while the other data center is coupled to at least one ISP, which may be one of the two ISPs or a different ISP.

Interautonomous system routing uses BGP or, more specifically the Exterior Border Gateway Protocol (E-BGP), to exchange routing information for ISPs 13 and 17 and the internet as indicated by E-BGP links 23, 24 and 25. E-BGP is a routing protocol used to exchange routing information across the internet. This protocol makes it possible for ISPs to connect to each other and for data centers 12 and 16 to connect to more than one ISP and to exchange network routing information with other networks.

E-BGP utilizes a best path algorithm that follows a series of steps to determine the best path to a router at a specific destination. For routers and switches that implement BGP, one preferred router is the Catalyst 6509 router, which is commercially available from Cisco Systems, the assignee of the present invention.

Both data centers 12 and 16 advertise the same route but from two different sites. For site-to-site load balancing purposes, both data centers host active applications and serve clients. Applications are software programs that use the operating system to control the data center's computer resources. Applications may be active concurrently for load balancing purposes or the applications can be hosted in a logical active/standby mode. Logical active/standby mode means that some applications will be active on one site while those same applications will be in standby mode at the second site. Different applications will be active at the second site and in a standby mode at the first site. Support for logical active/standby mode depends on the capabilities of specific applications and databases. If supported, IGP is used to route traffic to the data center that is logically active for a specific application.

Communication between data centers 12 and 16 utilizes Internal Gateway Protocol (OSPF) between edge routers 14 and 18. This is indicated by an IGP link 37.

In one preferred embodiment, the IP Anycast mechanism allows clients to request the topologically closest data center so that clients may be dynamically distributed between available sites. IP Anycast is thus used to load balance client traffic.

Figure 4:
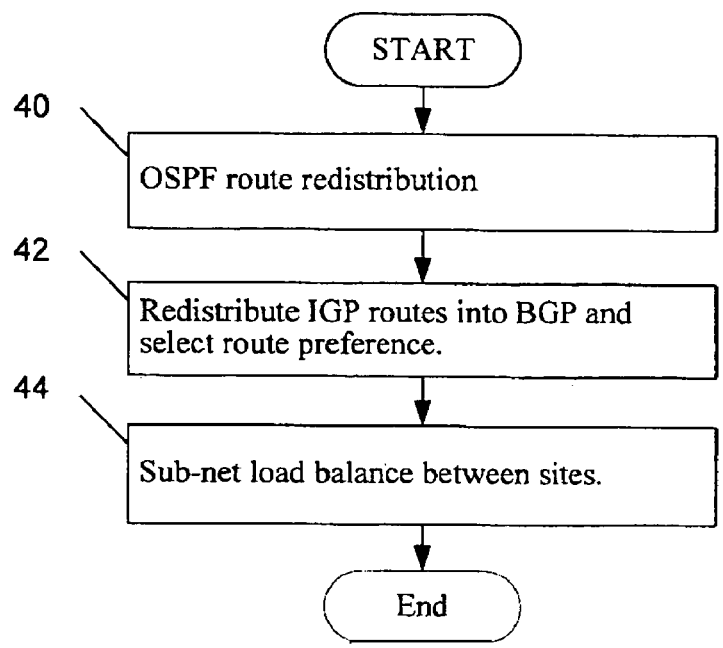
FIG. 4 is a flow diagram illustrating steps for implementing the active/active data center topology in accordance with the present invention.

FIG. 4 is a flow diagram illustrating steps for implementing the active/active data center topology in accordance with the present invention. The initial step is to redistribute and summarize OSPF routes as indicated at step 40. Once the routes are redistributed and summarized, the routes are redistributed in BGP and the preference of routes is selected as indicated in step 42. Subsequently, IGP is used between sites for subnet-based load balancing as indicated at step 44.

Figure 5:
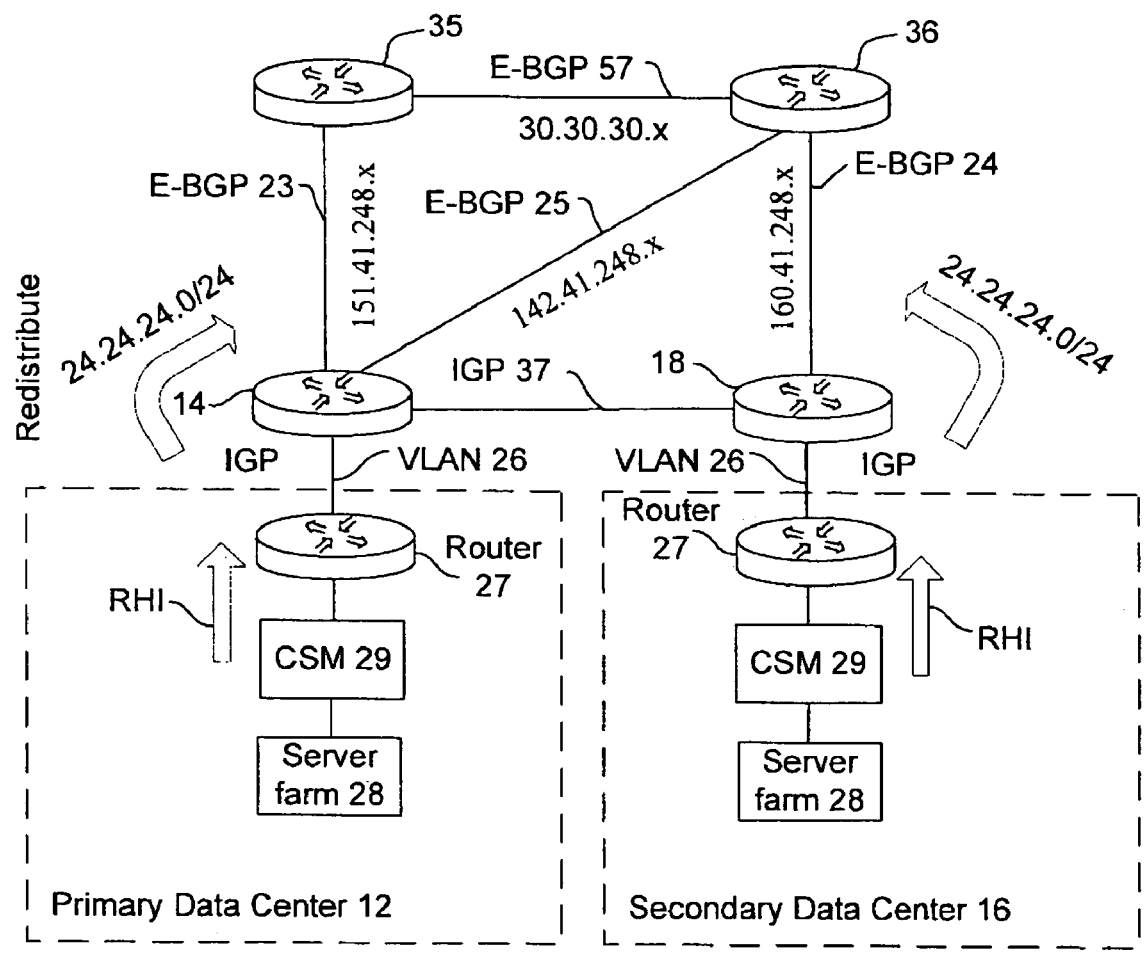
FIG. 5 is a block diagram of another exemplary active/active data center with a link between data centers in accordance with an embodiment of the present invention.

FIG. 5 is a more detailed illustration of the data center topology shown in FIG. 3 that illustrates the use of BGP for data center-to-data center recovery in the event of a disaster. Each data center 12 and 16 comprise a plurality of servers in server farm 28 coupled to edge routers 14 and 18, respectively, by content switch managers or CSM 29 and router 27. CSM 29 is primarily responsible for load balancing client requests to access one of the servers or other computer resource in server farm 28. Typically, each server farm 28 is a replica of the other server farm in the autonomous system in order to provide the intended services in an uninterrupted fashion.

RHI is used to inject routes of interest to routers 27. Each router 27 is preferably a CATALYST 6500 router in which case CSM 26 and router 27 share a common chassis. Routers 27 are coupled to edge routers 15 and 16 by the IGP internal network, which is represented by VLAN 26 in FIG. 5. Links 23, 24 and 25 are preferably E-EGP links.

RHI is activated at each active data center using the "advertise active" command available with virtual servers. This command tells CSM 26 to install a host route in router 27 only if the virtual server in the server farm is in an operational state. A virtual server is in the operational state when at least one of the servers in the same server farm is operational. Extensive probing is available on the CSM 29 to check the health of the servers and the appropriate application daemons. For RHI to work, both the edge router and the CSM must share client-side VLAN 29.

Implementation of the active/active data center topology of FIG. 5 utilizes OSPF route redistribution and summarization as well as BGP route redistribution and route preference. FIG. 5 illustrates subnet-based load balancing solution with an IGP link between the sites. This topology provides disaster recovery and load distribution by utilizing a combination of IP Anycast, BGP, IGP and route health injection (RHI). A significant advantage of including the IGP link is it possible to change from an active/active topology to an active/standby topology by merely changing the OSPF cost of the link. Thus, the secondary data center can be taken out of service by a simple IGP cost modification. To illustrate, by just increasing the OSPF cost on the link connecting the edge router to the internal MSFC it is possible for a data center to be brought down for maintenance without stopping BGP updates. The traffic that comes in from other ISPs to the secondary data center can be forwarded to the primary data center over the internal link. Internet clients and ISPs are not aware of any route changes. In most environments, this internal link is a virtual LAN (VLAN) or other high bandwidth link.

As described above in conjunction with FIGS. 1 and 2, OSPF route redistribution and summarization uses RHI to advertise the VIP address throughout the network and to the edge routers 14 or 18. Similarly, summarization of host routes occurs on a multilayer switch card, such as the Cisco Multi-Layer Switch Feature Card (MSFC), at the boundary between two autonomous systems in OSPF. OSPF reconfiguration and summarization for the embodiment illustrated in FIG. 3 is also shown by the configuration of Tables 1 and 2.

Also, as described above in conjunction with the embodiment of FIG. 2, the edge routers 14 and 18 distribute OSPF into their BGP process using a prefix-list and each router updates their neighbor with routes. Similarly, the BGP configuration of data center 12 as the primary site edge router 14 for the embodiment shown in FIG. 3 is also shown in Table 3:

The BGP configuration of data center 16 as the secondary site edge router 18 is also shown in Table 4:

Subnet-Based Load Balancing Using IGP Between Sites

Although an IGP link between the active data centers is not necessary, certain operational features are possible with the IGP link. For example, if the link between an ISP and one of the data centers goes down, traffic can still be transferred to the site previously handling the client. By way of illustration, if data center 16 were to lose the link to ISP 17, traffic may routed over the internet to the other ISP 13 and then over the IGP link to data center 16. In this manner, a data center is not taken off line even if the ISP is experiencing network problems.

Subnet-based load balancing uses an IGP link to route traffic between sites within seconds if either data center or edge router fails. In the subnet-based design, the two sites are active at the same time, and the clients that get routed to a specific site terminate their connection to the data center at that specific site. If the data center fails at that site, traffic is routed to the second site through the internal IGP link. If the entire site fails, including the edge routers, external clients can still reach the second data center through the external network. The subnet-based implementation or the present invention also provides a quick way to bring down the site for maintenance.

Before implementing the subnet-based load balancing solution with IGP, the general configurations for OSPF route redistribution and summarization and BGP route redistribution and route preference must be completed. Once these configurations are completed, it is possible to configure the data centers for subnet-based load balancing using the IGP link between sites is illustrated in Table 12.

TABLE 12

72k-edgeSecDC#sh ip route 24.24.24.0
Routing entry for 24.24.24.0/24
Known via "ospf 1", distance 110, metric 21, type extern 1
Redistributing via bgp 3
Advertised by bgp 3 route-map OspfRouteFilter
  Last update from 10.10.0.6 on FastEthernet4/0, 00:10:27 ago
  Routing Descriptor Blocks:
    * 10.10.0.6, from 140.40.248.130, 00:10:27 ago, via FastEthernet4/0
      Route metric is 21, traffic share count is 1
72k-edgeSecDC#
72k-edgeSecDC#conf t
Enter configuration commands, one per line. End with CNTL/Z.
72k-edgeSecDC(config) #interface FastEthernet4/0
72k-edgeSecDC(config-if)# ip address 10.10.0.130 255.255.255.0
72k-edgeSecDC(config-if)# ip ospf cost 5
72k-edgeSecDC(config-if)#^Z TABLE 12-continued

```
72k-edgeSecDC#
72k-edgeSecDC#
72k-edgeSecDC#sh ip route 24.24.24.0
Routing entry for 24.24.24.0/24
  Known via "ospf 1", distance 110, metric 22, type extern 1
  Redistributing via bgp 3
  Advertised by bgp 3 route-map OspfRouteFilter
  Last update from 141.41.248.129 on FastEthernet5/0, 00:00:12 ago
  Routing Descriptor Blocks:
  * 141.41.248.129, from 130.40.248.130, 00:00:12 ago, via
    FastEthernet5/0
    Route metric is 22, traffic share count is 1
```

Table 13 illustrates the routing tables configurations for steady state routes.

TABLE 13

```
72k-edgePriDC#sh ip route 24.24.24.0
Routing entry for 24.24.24.0/24
  Known via "ospf 1", distance 110, metric 21, type extern 1
  Redistributing via bgp 3
  Advertised by bgp 3 route-map OspfRouteFilter
  Last update from 10.0.0.6 on FastEthernet1/1, 00:08:57 ago
  Routing Descriptor Blocks:
  * 10.0.0.6, from 130.40.248.130, 00:08:57 ago, via FastEthernet1/1
      Route metric is 21, traffic share count is 1
72k-edgePriDC#
72k-edgePriDC#sh ip bgp 0.0.0.0
BGP routing table entry for 0.0.0.0/0, version 6
Paths: (2 available, best #2, table Default-IP-Routing-Table)
  Not advertised to any peer
  2
    142.41.248.132 from 142.41.248.132 (160.41.248.132)
      Origin IGP, localpref 100, weight 200, valid, external
  1
    151.41.248.131 from 151.41.248.131 (151.41.248.131)
      Origin IGP, localpref 100, weight 2000, valid, external, best
72k-edgePriDC#
Cat6k-ISP1#sh ip bgp 24.24.24.0
BGP routing table entry for 24.24.24.0/24, version 18
Paths: (2 available, best #1)
  Advertised to non peer-group peers:
  30.30.30.132
  3
    151.41.248.129 from 151.41.248.129 (151.41.248.129)
      Origin incomplete, metric 20, localpref 100, valid, external, best
  2 3
    30.30.30.132 from 30.30.30.132 (160.41.248.132)
      Origin incomplete, localpref 100, valid, external
Cat6k-ISP1#
72k-ISP2#sh ip bgp 24.24.24.0
BGP routing table entry for 24.24.24.0/24, version 7
Paths: (3 available, best #3, table Default-IP-Routing-Table)
Multipath: eBGP
  Advertised to non peer-group peers:
  30.30.30.131 142.41.248.129
  1 3
    30.30.30.131 from 30.30.30.131 (151.41.248.131)
      Origin incomplete, localpref 100, valid, external
  3
    142.41.248.129 from 142.41.248.129 (151.41.248.129)
      Origin incomplete, metric 30, localpref 100, valid, external
  3
    160.41.248.130 from 160.41.248.130 (160.41.248.130)
      Origin incomplete, metric 20, localpref 100, valid, external, best
72k-ISP2#
72k-ISP2#
72k-edgeSecDC#sh ip route 24.24.24.0
Routing entry for 24.24.24.0/24
  Known via "ospf 1", distance 110, metric 22, type extern 1
  Redistributing via bgp 3
  Advertised by bgp 3 route-map OspfRouteFilter
  Last update from 141.41.248.129 on FastEthernet5/0, 00:37:05 ago
  Routing Descriptor Blocks:
  * 141.41.248.129, from 130.40.248.130, 00:37:05 ago, via
    FastEthernet5/0
    Route metric is 22, traffic share count is 1
```

TABLE 13-continued

```
72k-edgeSecDC#
72k-edgeSecDC#sh ip bgp 0.0.0.0
BGP routing table entry for 0.0.0.0/0, version 27
Paths: (1 available, best #1, table Default-IP-Routing-Table)
  Not advertised to any peer
  2
    160.41.248.132 from 160.41.248.132 (160.41.248.132)
      Origin IGP, localpref 100, valid, external, best
72k-edgeSecDC#
72k-edgeSecDC#sh run int f4/0
Building configuration . . .
Current configuration : 100 bytes
!
interface FastEthernet4/0
  ip address 10.10.0.130 255.255.255.0
  ip ospf cost 5
  duplex full
end
72k-edgeSecDC#
```

Tables 14-16 illustrates several test cases that were conducted to verify the topology shown in FIGS. 3 and 5. Notice how the routes change in each test case. All the traceroutes were conducted from a host connected to ISP 12. Table 14 illustrates the case where the primary edge link (denoted as f2/0 in Table 14) to ISP 13 (denoted as ISP1 in Table 14) goes down. The route disappeared from the ISP router within five seconds after a direct link failure. Table 15 illustrates the case where the primary edge link to ISP 13 and the link (denoted as f3/0 in Table 15) to ISP 17 (denoted as ISP2 in Table 15) both go down. Table 16 illustrates the case where the primary data center CSM 29 goes down.

TABLE 14

```
72k-edgePriDC#sh ip bgp 0.0.0.0
BGP routing table entry for 0.0.0.0/0, version 8
Paths: (1 available, best #1, table Default-IP-Routing-Table)
  Not advertised to any peer
  2
    142.41.248.132 from 142.41.248.132 (160.41.248.132)
      Origin IGP, localpref 100, weight 200, valid, external, best
72k-edgePriDC#
Cat6k-ISPl#sh ip bgp 24.24.24.0
BGP routing table entry for 24.24.24.0/24, version 20
Paths: (1 available, best #1)
  Not advertised to any peer
  2 3
    30.30.30.132 from 30.30.30.132 (160.41.248.132)
      Origin incomplete, localpref 100, valid, external, best
Cat6k-ISP1#
72k-ISP2#sh ip bgp 24.24.24.0
BGP routing table entry for 24.24.24.0/24, version 7
Paths: (2 available, best #2, table Default-IP-Routing-Table)
Multipath: eBGP
  Advertised to non peer-group peers:
  30.30.30.131 142.41.248.129
  3
    142.41.248.129 from 142.41.248.129 (151.41.248.129)
      Origin incomplete, metric 30, localpref 100, valid, external
  3
    160.41.248.130 from 160.41.248.130 (160.41.248.130)
      Origin incomplete, metric 20, localpref 100, valid, external, best
72k-ISP2#
3500AP#traceroute 24.24.24.1
Type escape sequence to abort.
Tracing the route to 24.24.24.1
  1 55.55.1.1 3 msec 3 msec 2 msec (ISP1)
  2 30.30.30.132 2 msec 5 msec (ISP2)
  3 160.41.248.130 3 msec 2 msec 3 msec (Secondary Datacenter)
  4 141.41.248.129 2 msec 3 msec 5 msec (Primary Datacenter)
  5 10.0.0.6 2 msec 3 msec 3 msec (Cat6k in Primary Datacenter)
  6 * * *
```

TABLE 15

```
72k-edgePriDC#
72k-edgePriDC#sh ip route 0.0.0.0
Routing entry for 0.0.0.0/0, supernet
   Known via "ospf 1", distance 110, metric 1, candidate default path
   Tag 1, type extern 2, forward metric 1
   Redistributing via bgp 3
   Last update from 141.41.248.130 on FastEthernet0/0, 00:00:45 ago
   Routing Descriptor Blocks:
   * 141.41.248.130, from 160.41.248.130, 00:00:45 ago,
   viaFastEthernet0/0
     Route metric is 1, traffic share count is 1
     Route tag 1
72k-edgePriDC#
72k-edgeSecDC#sh ip route 24.24.24.0
Routing entry for 24.24.24.0/24
   Known via "ospf 1", distance 110, metric 22, type extern 1
   Redistributing via bgp 3
   Advertised by bgp 3 route-map OspfRouteFilter
   Last update from 141.41.248.129 on FastEthernet5/0, 00:52:32 ago
   Routing Descriptor Blocks:
   * 141.41.248.129, from 130.40.248.130, 00:52:32 ago,
   via FastEthernet5/0
     Route metric is 22, traffic share count is 1
72k-edgeSecDC#
Cat6k-ISP1#sh ip bgp 24.24.24.0
BGP routing table entry for 24.24.24.0/24, version 20
Paths: (1 available, best #1)
   Not advertised to any peer
   2 3
     30.30.30.132 from 30.30.30.132 (160.41.248.132)
       Origin incomplete, localpref 100, valid, external, best
Cat6k-ISP1#
72k-ISP2#sh ip bgp 24.24.24.0
BGP routing table entry for 24.24.24.0/24, version 7
Paths: (1 available, best #1, table Default-IP-Routing-Table)
Multipath: eBGP
   Advertised to non peer-group peers:
   30.30.30.131
   3
     160.41.248.130 from 160.41.248.130 (160.41.248.130)
       Origin incomplete, metric 20, localpref 100, valid, external, best
72k-ISP2#
3500AP#traceroute 24.24.24.1
Type escape sequence to abort.
Tracing the route to 24.24.24.1
  1 55.55.1.1 0 msec 3 msec 0 msec          (ISP1)
  2 30.30.30.132 3 msec 3 msec 2 msec       (ISP2)
  3 160.41.248.130 3 msec 3 msec 3 msec     (Secondary Site Edge Router)
  4 141.41.248.129 2 msec 3 msec 2 msec     (Primary Site Edge Router )
  5 10.0.0.6 6 msec 2 msec 3 msec           (Primary Data Center)
  6 * * *
```

TABLE 16

```
cat6K_1#sh ip route static
cat6K_1#
72k-edgePriDC#sh ip bgp 0.0.0.0
BGP routing table entry for 0.0.0.0/0, version 17
Paths: (2 available, best #2, table Default-IP-Routing-Table)
   Not advertised to any peer
   2
     142.41.248.132 from 142.41.248.132 (160.41.248.132)
       Origin IGP, localpref 100, weight 200, valid, external
   1
     151.41.248.131 from 151.41.248.131 (151.41.248.131)
       Origin IGP, localpref 100, weight 2000, valid, external, best
72k-edgePriDC#
72k-edgePriDC#sh ip route 24.24.24.0
Routing entry for 24.24.24.0/24
   Known via "ospf 1", distance 110, metric 26, type extern 1
   Redistributing via bgp 3
   Advertised by bgp 3 route-map OspfRouteFilter
   Last update from 141.41.248.130 on FastEthernet0/0, 00:01:04 ago
   Routing Descriptor Blocks:
   * 141.41.248.130, from 140.40.248.130, 00:01:04 ago,
   viaFastEthernet0/0
     Route metric is 26, traffic share count is 1
```

TABLE 16-continued

```
72k-edgePriDC#
72k-edgePriDC#
72k-edgeSecDC#sh ip bgp 0.0.0.0
BGP routing table entry for 0.0.0.0/0, version 27
Paths: (1 available, best #1, table Default-IP-Routing-Table)
   Not advertised to any peer
   2
     160.41.248.132 from 160.41.248.132 (160.41.248.132)
       Origin IGP, localpref 100, valid, external, best
72k-edgeSecDC#
72k-edgeSecDC#
72k-edgeSecDC#sh ip route 24.24.24.0
Routing entry for 24.24.24.0/24
   Known via "ospf 1", distance 110, metric 25, type extern 1
   Redistributing via bgp 3
   Advertised by bgp 3 route-map OspfRouteFilter
   Last update from 10.10.0.6 on FastEthernet4/0, 00:01:49 ago
   Routing Descriptor Blocks:
   * 10.10.0.6, from 140.40.248.130, 00:01:49 ago, via FastEthernet4/0
     Route metric is 25, traffic share count is 1
72k-edgeSecDC#
72k-edgeSecDC#
Cat6k-ISP1#sh ip bgp 24.24.24.0
BGP routing table entry for 24.24.24.0/24, version 27
Paths: (2 available, best #1)
   Advertised to non peer-group peers:
   30.30.30.132
   3
     151.41.248.129 from 151.41.248.129 (151.41.248.129)
       Origin incomplete, metric 20, localpref 100, valid, external, best
   2 3
     30.30.30.132 from 30.30.30.132 (160.41.248.132)
       Origin incomplete, localpref 100, valid, external
Cat6k-ISP1#
Cat6k-ISP1#
72k-ISP2#sh ip bgp 24.24.24.0
BGP routing table entry for 24.24.24.0/24, version 7
Paths: (3 available, best #3, table Default-IP-Routing-Table)
Multipath: eBGP
   Advertised to non peer-group peers:
   30.30.30.131 142.41.248.129
   3
     142.41.248.129 from 142.41.248.129 (151.41.248.129)
       Origin incomplete, metric 30, localpref 100, valid, external
   1 3
     30.30.30.131 from 30.30.30.131 (151.41.248.131)
       Origin incomplete, localpref 100, valid, external
   3
     160.41.248.130 from 160.41.248.130 (160.41.248.130)
       Origin incomplete, metric 20, localpref 100, valid, external, best
72k-ISP2#
72k-ISP2#
3500AP#traceroute 24.24.24.1
Type escape sequence to abort.
Tracing the route to 24.24.24.1
  1 55.55.1.1 2 msec 3 msec 2 msec          (ISP1)
  2 151.41.248.129 3 msec 2 msec 0 msec     (Primary Site Edge Router )
  3 141.41.248.130 0 msec 2 msec 0 msec     (Secondary Site Edge Router)
  4 10.10.0.6 2 msec 2 msec 3 msec          (Secondary Data Center)
  5 * * *
```

Advantageously, in the event of a disaster at one data center, the present invention is able to quickly converge and direct traffic to the other data center much faster compared to a DNS or http based solution. Accordingly, the present invention provides the architecture and topology of at least two data centers with at least one active data center connected to multiple ISPs. It will be apparent to one of skill in the art that other architectures or topologies may be successfully employed and the described embodiments are not intended to be limiting. Further, although the present embodiments are described in terms of a distributed data center, other networks or network systems may use the invention to provide disaster recovery.

Although the invention has been described with respect to specific embodiments thereof, these embodiments are merely illustrative, and not restrictive of the invention. For example, the network may include different routers, switches, servers and other components or devices that are common in such networks. Further, these components may comprise software algorithms that implement connectivity functions between the network device and other devices in a manner different from that described herein.

The executable code described herein may be implemented in any suitable programming language to implement the routines of the present invention including C, C++, Java, assembly language, etc. Different programming techniques can be employed such as procedural or object oriented. The routines can operate in an operating system environment or as stand-alone routines occupying all, or a substantial part, of the system processing.

In the description herein, specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. For example, although the embodiments are described in terms of a router and specifically a Cisco Catalyst 6500 router, other routers from Cisco or other manufacturers, aggregators or network switches may be used. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment" or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. In an autonomous system, a method for load balancing and recovering from a disaster comprising:
    hosting active applications and serving clients from at least two active data centers in said autonomous system;
    advertising the same route from said at least two active data centers;
    routing client traffic to one of said plurality of data centers using IP Anycast mechanism;
    using "advertise active" command in route health injection (RHI) to install a host route in an edge router if a virtual server in said data center is in an operational state;

advertising the availability of a virtual IP (VIP) address throughout the network;

injecting, from an internal routing protocol into an external routing protocol, a static route by redistribution;

configuring route summarization in OSPF;

configuring BGP route redistribution and route preference to update neighboring routers; and using Interior Gateway Protocol and sub-net based load balancing on a direct link between said at least two active data centers.

2. The method of claim 1 further comprising using Exterior Border Gateway Protocol (E-BGP) for interautonomous system routing and to exchange network routing information with other networks.

3. The method of claim 1 further comprising controlling incoming and outgoing routes in BGP by using weights and the multi-exit discriminator (MED) attribute to prefer routes during steady state operation.

4. The method of claim 1 further comprising probing the health of the servers in each data center and the appropriate application daemon that runs on the servers.

5. In a data center topology having a plurality of data centers with each data center comprising at least a server cluster, a method for load balancing and managing traffic flow between at least two active data centers, the method comprising:

providing a plurality of application services at server clusters at each of the at least two data centers;

redistributing IGP routes into BGP at the at least two data centers;

directing traffic to said data centers using an IP Anycast mechanism to achieve load balancing based on directing traffic to the closest data center;

activating route health injection (RHI) at each active data center using the "advertise active" command;

monitoring the health of each data center; and in the event one of said data centers becomes unavailable, causing future traffic to be directed to another data center by modifying an OSPF cost metric of a link to the unavailable data center.

6. The method of claim 5 further comprising using the same virtual IP address (VIP) to represent the server cluster at each data center for each application.

7. The method of claim 6 wherein the same sub-net that comprises all the VIPs is advertised to internet with BGP.

8. The method of claim 7 further comprising redistributing RHI static routes into an IGP-specific protocol at said router and using an OSPF metric-type 1 for adding the internal cost to the external cost of each route.

9. In an autonomous system, a method for load balancing and recovering from a disaster, the method comprising:

hosting active applications and serving clients from at least two active data centers in said autonomous system;

advertising the same route from said at least two active data centers;

routing client traffic to one of said plurality of data centers using IP Anycast mechanism;

using "advertise active" command in route health injection (RHI) to install a host route in an edge router if a virtual server in said data center is in an operational state;

advertising the availability of a virtual IP (VIP) address throughout the network;

injecting, from an internal routing protocol into an external routing protocol, a static route by redistribution;

configuring route summarization in OSPF; and configuring BGP route redistribution and route preference to update neighboring routers.

10. The method of claim 9 further comprising using Exterior Border Gateway Protocol (E-BGP) for interautonomous system routing and to exchange network routing information with other networks.

* * * * *

UNITED STATES PATENT AND TRADEMARK OFFICE
CERTIFICATE OF CORRECTION

PATENT NO.           : 7,609,619 B2                                                                 Page 1 of 1
APPLICATION NO.   : 11/067037
DATED                    : October 27, 2009
INVENTOR(S)          : Zeeshan Naseh et al.

It is certified that error appears in the above-identified patent and that said Letters Patent is hereby corrected as shown below:

In column 3, line 27, delete "ISPs 3" and insert -- ISPs 13 --, therefor.

In column 5, line 31, delete "[110/21]" and insert -- [110/2] --, therefor.

In column 10, line 4, delete "cat6K_1#" and insert -- cat6K_I# --, therefor.

In column 14, line 42, delete "Cat6k-ISPI#sh" and insert -- Cat6k-ISP1#sh --, therefor.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO.       : 7,609,619 B2
APPLICATION NO.  : 11/067037
DATED            : October 27, 2009
INVENTOR(S)      : Naseh et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1032 days.

Signed and Sealed this

Twelfth Day of October, 2010

David J. Kappos
*Director of the United States Patent and Trademark Office*